United States Patent
Schmid et al.

[11] Patent Number: 5,562,022
[45] Date of Patent: Oct. 8, 1996

[54] OVEN SYSTEM

[75] Inventors: Karl Schmid, Unterengstrigen; Jürg Albrecht, Tägerig, both of Switzerland

[73] Assignee: Premark FEG Corporation, Wilmington, Del.

[21] Appl. No.: 420,106

[22] Filed: Apr. 11, 1995

[30] Foreign Application Priority Data

Apr. 15, 1994 [DE] Germany .......................... 44 13 050.3

[51] Int. Cl.⁶ .............................. A47J 37/04; A47J 37/07
[52] U.S. Cl. ...................... 99/421 H; 99/419; 99/421 P; 126/25 R; 126/41 B
[58] Field of Search ................... 99/419–421 P, 99/427, 444, 448, 446, 449, 450; 126/25 R, 41 A, 41 B

[56] References Cited

U.S. PATENT DOCUMENTS

| | | | |
|---|---|---|---|
| 2,762,293 | 9/1956 | Boyajian | 99/421 P |
| 2,821,905 | 2/1958 | Culligan | 99/421 |
| 3,196,776 | 7/1965 | Norton | 99/421 P |
| 3,232,247 | 2/1966 | Vaughan | 107/59 |
| 3,706,272 | 12/1972 | Wilson | 99/340 |
| 3,901,136 | 8/1975 | Wilson et al. | 99/446 |
| 3,951,052 | 4/1976 | Ringo | 99/427 |
| 4,470,343 | 9/1984 | Didier | 99/448 |
| 4,505,195 | 3/1985 | Waltman | 99/449 |
| 4,549,476 | 10/1985 | Langen | 99/450 |
| 4,688,477 | 8/1987 | Waltman | 99/449 |
| 4,723,482 | 2/1988 | Weiss et al. | 99/427 |
| 4,787,302 | 11/1988 | Waltman et al. | 99/427 |
| 4,873,920 | 10/1989 | Yang | 99/409 |
| 5,158,066 | 10/1992 | Dodgen | 99/446 |
| 5,184,540 | 2/1993 | Riccio | 99/421 H |
| 5,431,093 | 7/1995 | Dodgen | 99/427 |

FOREIGN PATENT DOCUMENTS

| | | |
|---|---|---|
| 2206925 | 6/1974 | France . |
| 2682009 | 4/1993 | France . |
| 1454152 | 5/1969 | Germany . |
| 7047203 | 12/1970 | Germany . |
| 2358119 | 5/1974 | Germany . |
| 2309483 | 12/1974 | Germany . |
| 4116544 | 10/1992 | Germany . |
| WO9013225 | 11/1990 | WIPO . |

*Primary Examiner*—Timothy F. Simone
*Attorney, Agent, or Firm*—Thompson Hine & Flory P.L.L.

[57] ABSTRACT

The invention is an oven system for roasting, cooking, baking and regenerating, as well as for grilling foodstuffs by supplying heat into a cooking space of the oven. The oven system includes at least one slide-in frame movable into and out of the cooking space, respectively, the slide-in frame having at least two respectively connected rotating discs which are rotatably supported on the opposing inner sides of the slide-in frame. The oven system also includes receivers for the foodstuffs which are releasably attached to the rotating discs and at least one drive mechanism mounted on the oven for rotating a rotating disc. The drive is engageable with and disengageable from the rotating disc.

8 Claims, 4 Drawing Sheets

OVEN SYSTEM

BACKGROUND OF THE INVENTION

The invention relates to an oven system for roasting, cooking, baking and regenerating on the one hand and, on the other hand, for grilling foodstuffs by introducing heat into a cooking space of the oven.

The most varied oven systems are known for roasting or grilling items to be grilled such as roast chicken, roast beef, whole suckling pigs or the like. In order to achieve an optimum grilling result, it is necessary to roast or grill the items to be grilled from all sides. For this purpose, in the known oven systems, rotatable spits can be individually engaged with the rotating apparatus securely mounted for this purpose in the interior of the oven so that respectively only one spit can be taken out of the oven and newly loaded.

It is not possible with the known oven systems to remove all of these spits at one time in order to load the entire cooking space with new items to be grilled. This results on the one hand in an unavoidable loss of energy when inserting the new items to be grilled since the individual spits must be exchanged while the oven door is open and, on the other hand, in an undesirable loss of time. This is because the already heated oven cannot be used during the work-intensive process of replacing already completely cooked items to be grilled with those subsequently to be grilled. This is a considerable disadvantage in the large-scale catering trade.

A baking oven with a grilling arrangement is known from DE-GM 70 47 203 in which a dish part and a holder attachment form a slide-in frame. A grilling spit is rotatably mountable in the holder attachment. A disc which can be coupled with and decoupled from a drive element is securely mounted to the grilling spit such that the grilling spit can be rotated. The electrical motor serving for rotation of the drive element is provided outside the cooking space. Only one grilling spit can be driven in this oven system.

An oven system for grilling food is disclosed in DE-OS23 58 119 having two opposing rotating discs which are arranged at a distance from one another in the cooking space by means of spacing bars and on which rotating members are rotatably mounted. One rotating disc is driven by a drive via pinions. This rotating device formed by the rotating discs cannot be removed from the oven as a heat element projecting through one of the rotating discs is arranged coaxially about the rotating axis of the rotating discs and is securely mounted to a side wall of the oven.

The technical problem forming the basis of the invention consists in providing an oven system in which the exchanging of the entire cooking space contents can take place quickly in a simple manner and in which, additionally, the advantages of cooking or grilling on all sides can be realized.

SUMMARY OF THE INVENTION

The invention is based on the concept of further developing known so-called rack frames and associated ovens in such a manner that they can also be used for items to be grilled, but that the advantages of the rack frame are maintained at the same time; i.e. that, on the one hand, by exchanging the slide-in frame, a very quick exchanging of cooked and uncooked foodstuffs is possible and, on the other hand, an oven further developed according to the invention can now also be used for grilling. However, the use of the known rack frame in an oven system according to the invention is also still possible.

The known rack frames are structured in such a manner that a slide-in frame substantially fills the cooking space and that superimposed trays with items to be roasted placed on these can be arranged within the slide-in frame. It is then moved in front of the oven by means of a trolley provided for this purpose and the entire slide-in frame is taken out of or pushed into the oven with the aid of a lifting device. This makes it possible to very quickly exchange this with newly loaded trays.

However—as already explained—it is not possible with the known rack frames to rotate the items to be grilled, which leads to a grilling result that is not optimal. Only by first providing a drive means on the oven and by further developing the rack frame with, advantageously, one toothed disc engaged with the driving wheel which is driven inside the cooking space and by means of which the holding means for the foodstuffs are rotated has it been made possible to very quickly exchange different frames or inserts having the advantages of the rack frame for items to be grilled.

In order to protect the drive means inside the oven from soiling by means of fat and the like as well as from the high temperatures in the cooking space, it is advantageous that an electrical motor arranged outside the cooking space drives a drive pinion rotatably supported on the outer wall of the cooking space and that this pinion is connected with a driving wheel mounted on the inside of the corresponding side wall of the cooking space. In this manner the coupling and decoupling of the drive means of the slide-in frame with the receiving means rotatably supported therein has been made possible in a structurally simple manner.

By engaging a toothed disc rotatably supported on the slide-in frame with the driving wheel arranged on the inner side of the oven when the slide-in frame is inserted, the drive means in the oven is coupled or connected with the slide-in frame without further action by the operator by simply inserting the slide-in frame so that the, for example, pivotably supported receiving means including the items to be grilled can be rotated by the drive means.

A very simple design of the receiving means for the rotatably supported items to be grilled is advantageously achieved in such a manner that spits or suspended baskets or the like are mountable in a simple manner on at least two respectively connected rotating discs, of which one at least is securely connected with the toothed disc. Several rotating discs can also be provided such as to be in a rotatably driven via the single drive means in the oven, for example, by means of further chains and the like.

On account of the fact that at least one receiving shaft is respectively provided on the rotating discs, a suspended basket can be pivotably mounted so that the items to be grilled can be placed in such a suspended basket and, by simply mounting the baskets on the receiving shaft, the slide-in frame can be already loaded outside the oven.

Such a suspended basket for grilling the items to be grilled by rotation can advantageously have two spaced side walls connected with each other by bars, the side walls having engaging prongs which can engage in or be suspended from the receiving shafts on the rotating discs of the slide-in frame. On account of the design with the shafts, the items to be grilled can be grilled in an optimal manner from all sides. Additionally, it is possible to cook vegetables and other foodstuffs from all sides in the suspended baskets.

In order that the driving wheel is not damaged when pushing the slide-in frame into the cooking space possibly by inserting the slide-in frame at an angle, it is advantageous that a protective plate is mounted beneath and/or above the driving wheel on the inner side of the oven.

The guiding in or out of the slide-in frame according to the invention is simplified by means of guides advantageously provided in the base of the cooking space. These guides extend parallel to the direction of insertion and can, for example, consist of reinforced corrugations in which rollers roll that are advantageously provided on the slide-in frame.

An optimal grilling result is achieved on account of the fact that an oven is used which is not only heated by heating coils and/or top or bottom heating and/or a hot air supply, but also by steam supplied into the cooking space of the oven. An optimum moisture input is made possible on account of the supply of a steam and/or hot air mixture so that the grilling result is considerably improved. In comparison to a known grill, it is made possible that a weight loss of less than approximately 40% occurs. Additionally, in comparison to a grill used, for example, in a roasted chicken unit, an energy saving of approximately 50% can be achieved because the insulation of all the oven walls and of the oven door is possible in the oven system according to the present invention.

Furthermore, precooking with a lower temperature is made possible by the inventive oven system having a supply of steam.

Additionally, on account of the steam function of the inventive oven system, cleaning is considerably simplified even in the case of it being used as a grill because the deposited fat is more easily removed in the case of hot steam supply.

When only one spit is mounted on the receiving shafts of the rotating discs of the slide-in frame according to the invention, large pieces of meat or whole suckling pigs can also be grilled with the hot air steam cooker which in itself is known.

Advantageously, the electrical motor is provided with a transmission so that the number of revolutions within the cooking space of the rotating discs of the slide-in frame according to the invention can be desirably adjusted when this is in the inserted state.

It is also advantageous that a slip clutch is provided between the driving wheel on the oven and the electrical motor so that the drive means is not damaged in the event of a possible blockage of the rotation.

As the relevant hygienic requirements are very strict, it is advantageous to make the individual components of the slide-in frame and/or the suspended baskets from chrome nickel steel, stainless steel or other materials suitable for use in the oven. For the same reason, it is advantageous that the supports of the rotatable elements are sealed and/or self-lubricating or that they operate without lubrication.

For further explanation and better understanding of the invention, an exemplary embodiment is described and explained in more detail in the following with reference to the enclosed drawings, in which:

DESCRIPTION OF THE PREFERRED EMBODIMENT

Figure 1:
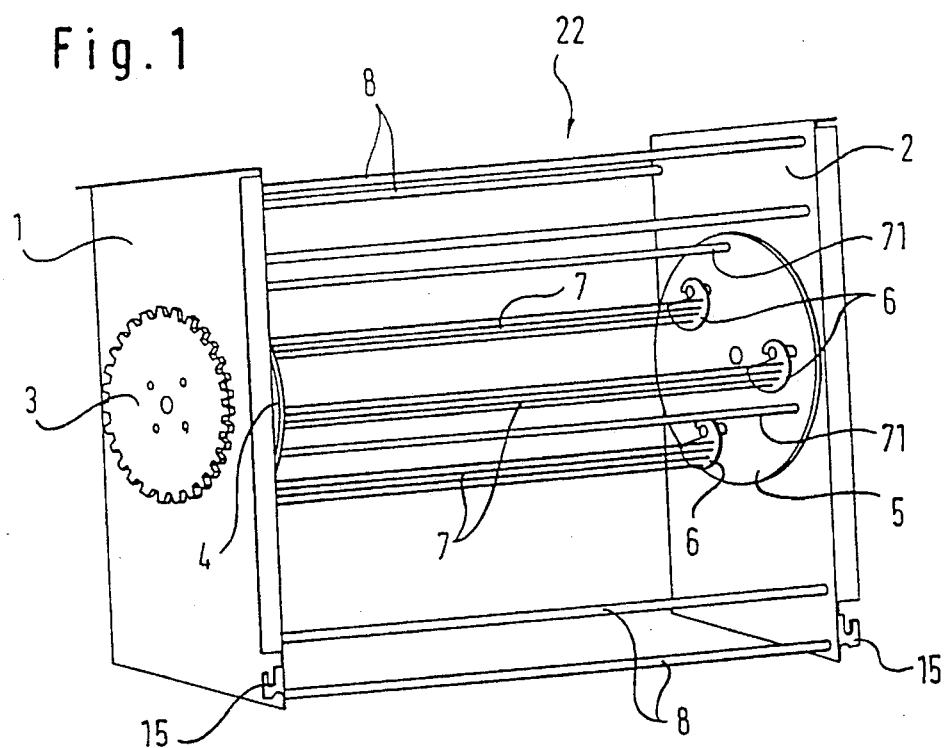
FIG. 1 shows a perspective view of an slide-in frame according to the invention with suspended baskets mounted therein.

As can be seen in FIG. 1, a slide-in frame 22 consists of two spaced side walls 1, 2 which are connected with each other by means of horizontally extending spacing rods 8. However, the connection is also possible by means of lower and upper metal plates. A rotating disc 4, 5 is respectively rotatably supported on the inner side of each sidewall 1,2. One of the rotating discs 4, 5, in this case the left-hand rotating disc 4, is rigidly connected via a shaft with a toothed disc 3 on the outer side of the corresponding side wall 1. Both rotating discs 4, 5 are securely connected with each other by means of connecting rods 71 so that both rotating discs 4, 5 rotate upon rotation of the toothed disc 3. At the opposing sides of the rotating discs 4, 5, there are respectively secured three opposing receiving pins 51 into which the suspended baskets 6 are hung. The suspended baskets 6 are described in more detail in the following. Engaging devices 15 are respectively provided at the lower forward side edges of the side walls 1, 2 with which a trolley known in itself (not shown) and including a lifting device can be engaged so that the entire slide-in frame 22 can be respectively moved into and out of the oven.

Figure 2:
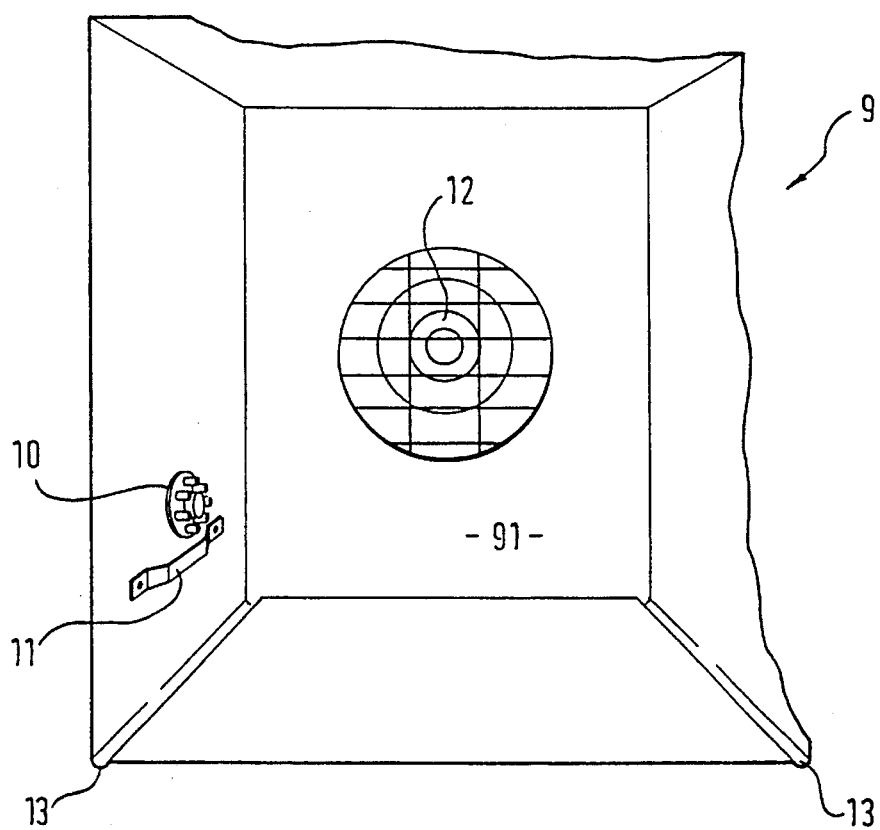
FIG. 2 shows the interior or cooking space of an oven with a drive wheel arranged to the side thereof.

The cooking space 91 of the oven 9 is shown in more detail in FIG. 2. A hot air ventilator 12 is arranged on the rear wall of the cooking space 91 by means of which hot air is supplied into the cooking space 91. A drive wheel 10 is arranged on the left-hand side wall of the cooking space 91 and is protected against damage by means of a protective plate 11 arranged therebeneath which projects from the side wall of the cooking space 91. Guide corrugations 13 are formed into the base plate of the cooking space 91 in the side regions so that the slide-in frame 22 is guided upon insertion and removal.

Figure 3:
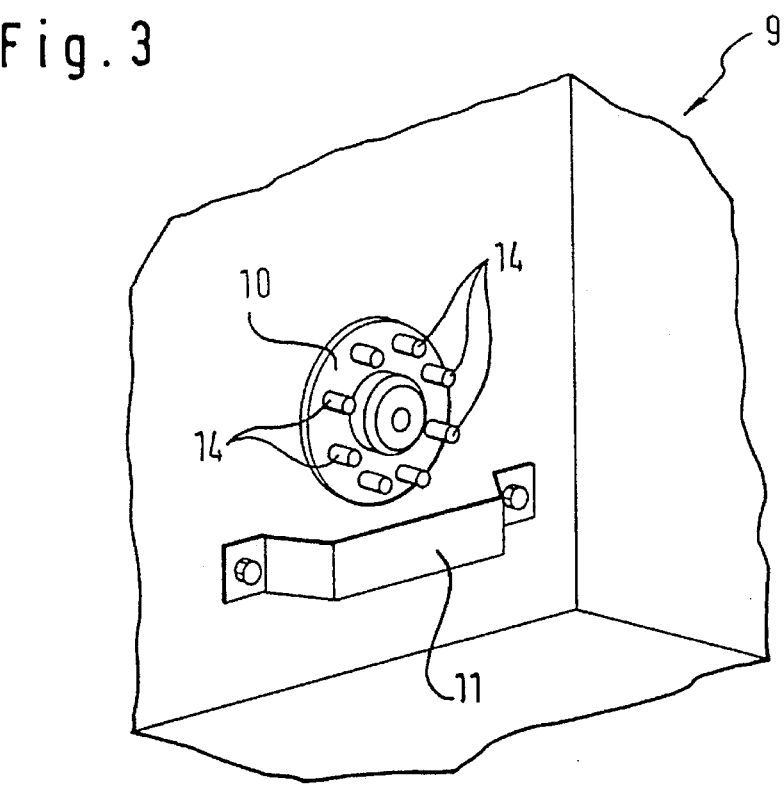
FIG. 3 shows a detail illustration of the drive wheel in the cooking space.

In the detailed illustration of the driving wheel 10 shown in FIG. 3, it can be recognized that a number of pins 14 are provided in circular arrangement on the drive wheel which engage with corresponding teeth of the toothed disc 3 of the slide-in frame 22 when the slide-in frame 22 is inserted. The protective plate 11 consists of a metal strip bent several times which projects further from the side wall of the cooking space 91 than the largest projection of the driving wheel 10. This plate can be secured to the side wall of the cooking space by means of screws or rivets or also by means of spot welding.

Figure 4:
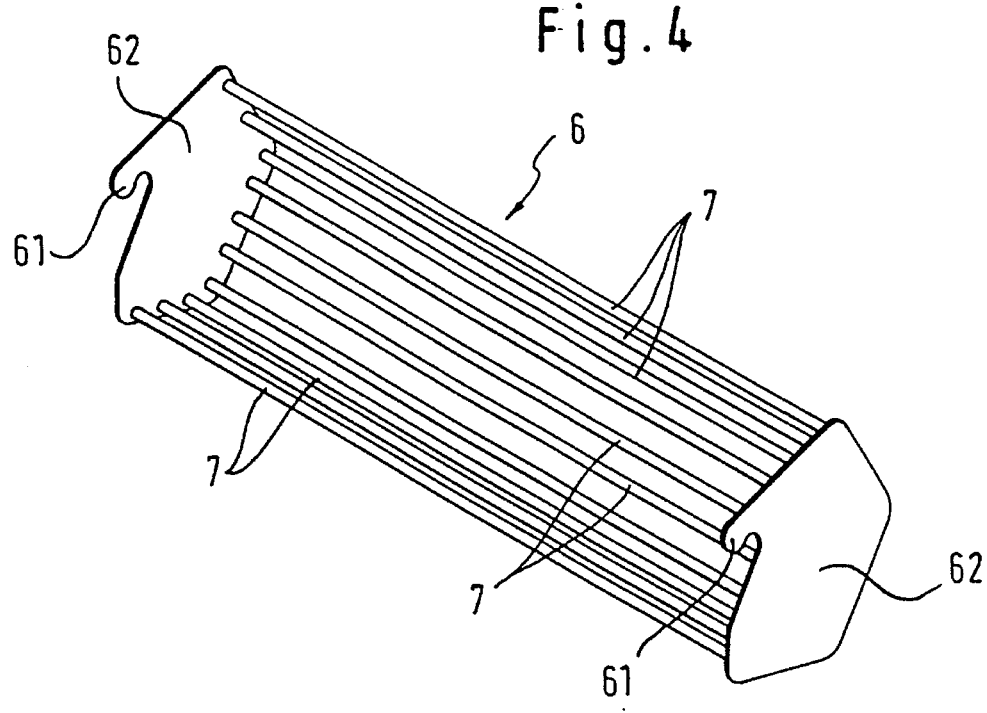
FIG. 4 shows a perspective illustration of a suspended basket.

A detailed illustration of a suspended basket 6 is shown in FIG. 4 and consists of two spaced basket walls 62 that are securely attached to each other by means of basket bars 7. The basket bars 7 in this case form a trough-like receiving member in cross section in which the items to be grilled are placed. Both basket walls 62 are provided with a notch so that a holding prong 61 is formed with which the corresponding receiving pins 51 on the rotating discs 4, 5 engage. In this manner, a suspension basket 6 is pivotably supported between both rotating discs 4, 5.

Figure 5:
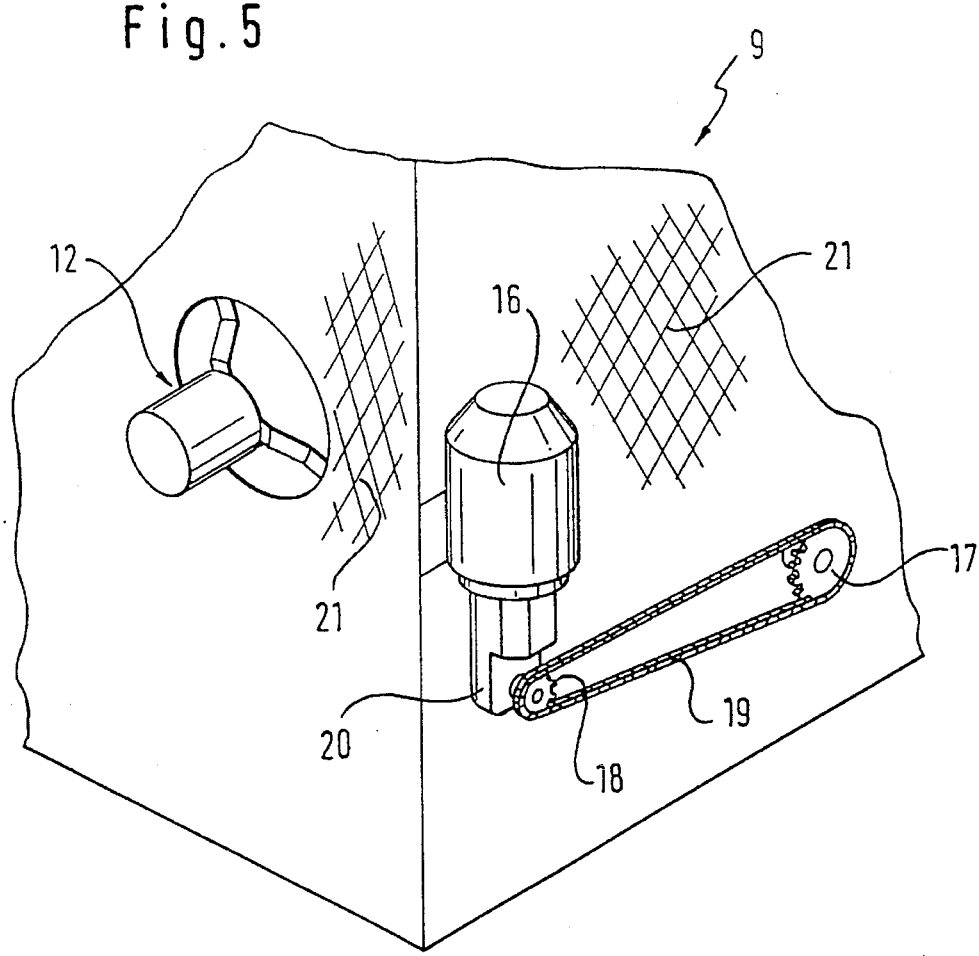
FIG. 5 shows a perspective view from the outside onto the rear and side surfaces of the oven with the additionally mounted electric motor and toothed drive.

FIG. 5 shows the outside view of the oven 9 with the outer wall removed. The rear view of the heated air ventilator 12 can be seen at the rear side of the oven. A drive means 16, in this case an electrical motor, is attached to a side wall of the oven 9 and drives a pinion 18 via a gear 20. The driven toothed pinion 17 is actuated by means of a chain 19 and is rigidly connected by means of a shaft to the driving wheel 10 mounted on the inner wall of the oven. In the perspective view shown in FIG. 5, the insulation 21 is also shown which surrounds all walls of the cooking space 91 on the outside.

Figure 6:
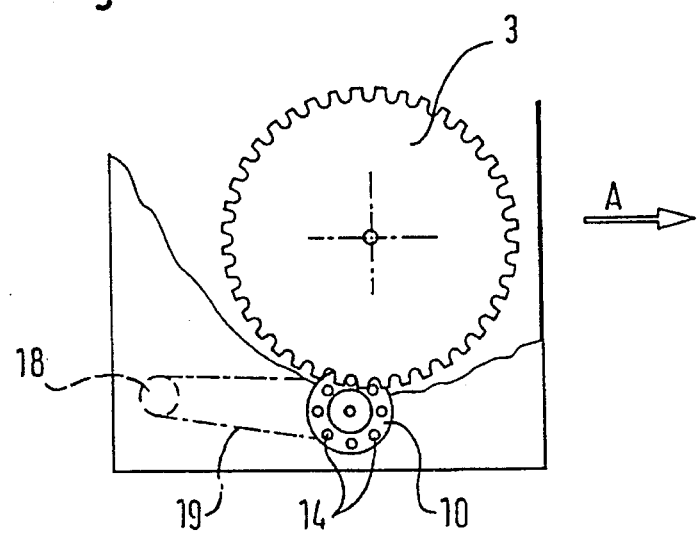
FIG. 6 shows a top plan view of the toothed disc on the slide-in frame and the drive wheel on the oven engaging therein.

FIG. 6 shows a schematic view of the slide-in frame 22 inserted in the cooking space 91. In this view, the side wall of the cooking space 91 is partially broken away. The toothed disc 3 of the slide-in frame 22 engages in the inserted state with the pins 51 of the driving wheel 10. The chain 19 and the pinion 18 which is driven by the electrical motor 16 are also indicated. When the slide-in frame 22 is removed in the direction of the arrow A, the toothed disc 3 disengages without difficulty from the driving wheel 10 on the inner side of the cooking space 91. In a corresponding manner, upon insertion of the slide-in frame 22 into the cooking space 91, the toothed disc 3 engages in the end position of the slide-in frame 22 with the driving wheel 10 and its pins 14 secured thereto.

Figure 7:
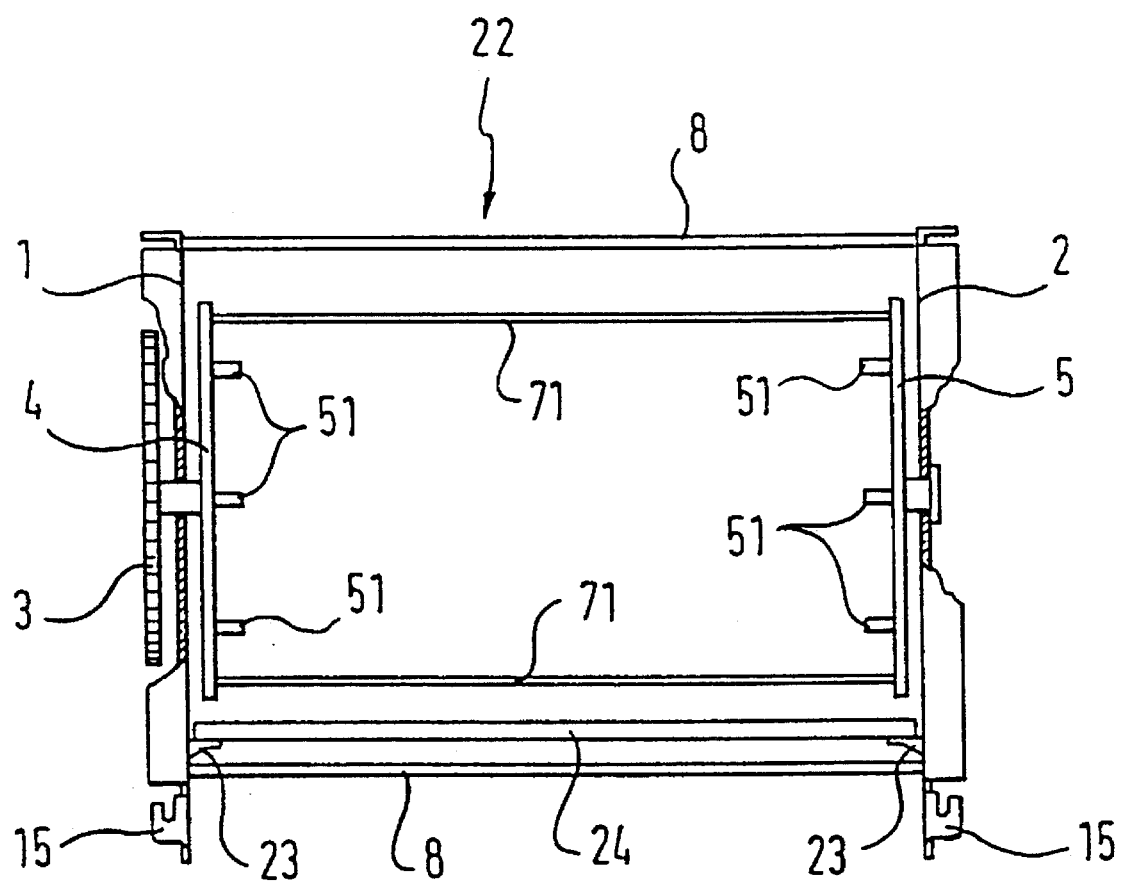
FIG. 7 shows a front view of the slide-in frame according to the invention as shown in FIG. 1.

When the electrical motor is then actuated, the drive pinion 17 mounted at the outer side of the cooking space is driven via the driving pinion 18 and the chain 19 as is simultaneously the driving wheel 10 at the inner side of the cooking space 91 rigidly connected with this. Accordingly, in the inserted state of the slide-in frame 22, the toothed disc 3 is rotated so that the rotating discs 4, 5 are rotated with this. Since the suspended baskets 6 in the suspended state are mounted in a freely pivoting manner between the rotating discs 4, 5 on the receiving pins 51, the items to be grilled are grilled from all sides in an optimal manner. The dripping fat is collected in a receiving tray 24, as shown in FIG. 7. The receiving tray 24 in this case lies on carriers 23 which are mounted on the side walls 1, 2.

When all the items to be grilled are completely grilled, the door on the oven 9, not shown, is opened and a trolley as is known having an engaging apparatus is moved forward so that this engages with the engaging devices 15 on the slide-in frame 22 and makes it possible that the entire slide-in frame 22 is removed from the cooking space 91 of the oven 9. Because a second slide-in frame 22 has already been prepared during the grilling period, the heat of the oven can then immediately be used for the next items to be grilled by simply exchanging the slide-in frames. For this purpose, the slide-in frame 22 loaded with the items which are not yet grilled is inserted into the cooking space 91, wherein the side walls 1, 2 lie on the guides 13. On account of the fact that a steam supply is advantageously provided in the cooking space 91, the grilling result is considerably improved. The steam supply takes place in a manner known in itself and has already been realized in various ovens.

On account of the fact that a pulse control is provided for the electrical motor, the loading and unloading of the baskets 6 can also take place in the state in which the slide-in frame 22 is inserted in the cooking space 91 by respectively positioning the baskets in an appropriate manner on the side facing the operator.

We claim:

1. An oven system for roasting, cooking, baking and regenerating, as well as for grilling foodstuffs by supplying heat comprising:

a cooking space;

at least one slide-in frame moveable into and out of said cooking space, said slide-in frame having two sides connected in a spaced manner, at least two rotating discs connected to and rotatably supported on said sides of said slide-in frame;

at least one receiver for foodstuffs, said receiver being releasably attached to said rotating discs; and at least one drive mechanism mounted on said oven system for rotation of at least one of said rotating discs, said drive being engageable with and disengageable from said rotating disc.

2. The oven system of claim 1 further including:

a driving pinion rotatably supported on the outside of said cooking space; and a driving wheel mounted on the inside of said cooking space; wherein said drive mechanism consists of an electrical motor arranged outside said cooking space, such that said electrical motor drives said driving pinion, and wherein said driving pinion is connected to said driving wheel.

3. The oven system of claim 2 further comprising a toothed disc rotatably supported on said slide-in frame such that it engages said driving wheel when said slide-in frame is inserted in said cooking space.

4. The oven system of claim 1 wherein said receiver comprises a suspension basket including two spaced basket side walls connected by rods, and wherein said basket side walls include holding prongs which are engageable in receiving pins on said rotating discs of said slide-in frame.

5. The oven system of claim 2 further comprising a protective plate mounted below or above said driving wheel on the inside of said cooking space.

6. The oven system of claim 1 further comprising at least one guide provided in a base portion of said cooking space for receiving said slide-in frame.

7. The oven system of claim 1 wherein said cooking space is heated by means selected from the group consisting of heating coils, top heating, bottom heating, a hot air supply, or any combination thereof.

8. The oven system of claim 1 further including a steam supply for said cooking space.

* * * * *

UNITED STATES PATENT AND TRADEMARK OFFICE
CERTIFICATE OF CORRECTION

PATENT NO. : 5,562,022
DATED : October 8, 1996
INVENTOR(S) : KARL SCHMID and JURG ALBRECHT It is certified that error appears in the above-indentified patent and that said Letters Patent is hereby corrected as shown below:

Title page, item: [75] "Unterengstrigen" should be
-- Unterengstringen --

Signed and Sealed this

Thirty-first Day of December, 1996

Attest:

BRUCE LEHMAN

Attesting Officer　　Commissioner of Patents and Trademarks